United States Patent
Watters et al.

(10) Patent No.: US 10,005,689 B2
(45) Date of Patent: Jun. 26, 2018

(54) ATMOSPHERIC WATER HARVESTER

(71) Applicant: Aerigo Water Technologies, L.L.C., Houston, TX (US)

(72) Inventors: Bryce P. Watters, Houston, TX (US); Mitesh R. Agrawal, Atlanta, GA (US); Blake A. Turner, Houston, TX (US)

( * ) Notice: Subject to any disclaimer, the term of this patent is extended or adjusted under 35 U.S.C. 154(b) by 819 days.

(21) Appl. No.: 14/200,244

(22) Filed: Mar. 7, 2014

(65) Prior Publication Data
US 2014/0251910 A1 Sep. 11, 2014

Related U.S. Application Data

(60) Provisional application No. 61/775,434, filed on Mar. 8, 2013.

(51) Int. Cl.
| | | |
|---|---|---|
| *C02F 9/00* | (2006.01) | |
| *C02F 1/42* | (2006.01) | |
| *B01D 53/26* | (2006.01) | |
| *C02F 1/44* | (2006.01) | |
| *C02F 1/32* | (2006.01) | |
| *C02F 1/28* | (2006.01) | |
| *C02F 103/18* | (2006.01) | |

(52) U.S. Cl.
CPC ............ *C02F 9/005* (2013.01); *B01D 53/263* (2013.01); *C02F 1/42* (2013.01); *C02F 1/281* (2013.01); *C02F 1/32* (2013.01); *C02F 1/441* (2013.01); *C02F 2103/18* (2013.01); *C02F 2301/08* (2013.01); *Y02W 10/37* (2015.05)

(58) Field of Classification Search
CPC .... C02F 9/00; C02F 9/005; C02F 1/26; C02F 1/265; C02F 1/28; C02F 1/281; C02F 1/32; C02F 1/41; C02F 1/44; C02F 1/441; C02F 2103/18; C02F 2201/008; C02F 2301/08; C02F 1/42; Y02W 10/37; B01D 53/02; B01D 53/025; B01D 53/04; B01D 53/06; B01D 53/14; B01D 53/1406; B01D 53/1431; B01D 53/145; B01D 53/1493; B01D 53/263
See application file for complete search history.

(56) References Cited

U.S. PATENT DOCUMENTS

| | | | | |
|---|---|---|---|---|
| 4,926,618 A * | 5/1990 | Ratliff | ............ | B01D 53/06 95/10 |
| 5,035,188 A * | 7/1991 | Johnson | ............ | B01D 53/40 110/215 |
| 5,128,043 A * | 7/1992 | Wildermuth | ............ | C02F 1/48 210/223 |
| 5,806,323 A * | 9/1998 | Bevier | ............ | B01D 53/0415 261/DIG. 15 |
| 6,156,102 A * | 12/2000 | Conrad | ............ | B01D 53/18 95/172 |
| 6,699,381 B2 * | 3/2004 | Nakamura | ............ | C02F 1/46104 204/267 |

(Continued)

*Primary Examiner* — David C Mellon
(74) *Attorney, Agent, or Firm* — Hasley Scarano, LLP.

(57) ABSTRACT

A method and a system are provided for producing water from atmospheric air by contacting the air with an aqueous hygroscopic material in a contacting chamber and allowing a portion of the water from the air to be adsorbed into the aqueous hygroscopic stream. The adsorbed water is then subsequently separated from the hygroscopic material to provide a clean water stream and a reconstituted hygroscopic stream.

33 Claims, 10 Drawing Sheets

(56) References Cited

U.S. PATENT DOCUMENTS

| | | | |
|---|---|---|---|
| 7,306,654 B2* | 12/2007 | King | B01D 5/003 |
| | | | 203/12 |
| 7,914,604 B2* | 3/2011 | Mello | B03C 3/09 |
| | | | 95/69 |
| 2006/0175253 A1* | 8/2006 | Bauer | B01D 9/00 |
| | | | 210/634 |
| 2012/0145635 A1* | 6/2012 | Lucas, III | B01D 61/022 |
| | | | 210/652 |

* cited by examiner

Demonstration of Vapor Pressure Laws

Single Rotating Packed Bed

Series Rotating Packed Beds

Parallel Rotating Packed Beds

Series Packed Bed Columns

Parallel Packed Bed Columns

ATMOSPHERIC WATER HARVESTER

CROSS-REFERENCE TO RELATED APPLICATIONS

This application claims priority to U.S. Provisional Application No. 61/775,434 ("the '434 Application") filed Mar. 8, 2013. The '434 Application is hereby incorporated by reference in its entirety for all purposes, including but not limited to, the claims and all portions describing the invention and the preferred embodiments of the invention, as well as those portions of the background information useful to understanding the claimed invention herein.

STATEMENTS REGARDING FEDERALLY SPONSORED RESEARCH OR DEVELOPMENT

None.

REFERENCE TO A MICROFICHE APPENDIX

None.

BACKGROUND OF THE INVENTION

1. Field of the Invention

The present invention relates to a method and system for producing liquid water from moisture in air.

2. Description of the Related Art

Fresh water is a finite resource which the global population is exhausting at a dangerously unprecedented rate. Developed nations have long been able to look at water problems as only being relevant to underdeveloped nations, desert areas and agrarian societies, but this is quickly becoming an outdated view. In recent years, overwhelming emphasis has been placed on energy issues, but regrettably little emphasis has been placed on fresh water. Currently over a billion people lack access to any clean water and this is part of a tend that is only increasing as the global population rises. From 1900 to 1995, the global population more than tripled, while demand for fresh water has disproportionally increased over six fold. Unfortunately, this unbalanced supply and demand shows no signs faltering. It is actually quite the opposite. Within the next 35 years the world population will increase by 40 to 50% and by 2030. The Water Resources Group estimates that global water demand will outstrip supply by 60% unless a solution is found.

Given the grave state of water availability, a need exists for a timely and economical solution. More particularly, as more people move inland and as cities become too dense, there is a need for an alternative avenue for generating clean water, and more particularly for a portable water supply for those areas where water is not readily found. The UN estimates that on average every US dollar invested in water and sanitation provides an economic return of eight US dollars. This is only the current rate, which merely takes into account the current demand and inefficient means of providing water. It is not only the poor rural regions of the world who are incapable of meeting their demand for water. The global urbanization rate has 60 million people moving into cities each year and in developing countries like China and India the rate is even higher. From Singapore to San Antonio, urban populations are rising and water is an increasingly scarce and precious commodity. While the water problems of the past were largely out of sight and out of mind, dispersed amongst low population rural areas, they are increasingly at the front door step of many nation's population centers. As the economies of these nations grow, there is an increasingly large class of people in them with the means and hard felt need for a technology to provide a clean water stream.

In 2012, for the first time ever, farmers in northwest Texas have had quotas placed on how much water they can pump, a situation all too common in many developing countries. This has and will continue to create strains between industries (e.g. oil & gas vs. agricultural vs. power producers) and between states (Georgia, Alabama, and Florida are in a dispute over water for drinking, recreational, farming, environmental purposes, and hydropower in the Apalachicola-Chattahoochee-Flint River system). The stress created by these conflicts will stifle cooperation when there is an increasing need of it to solve the water issue. Thirty percent of U.S. irrigated farmland depends on the Ogallala Aquifer, which is rapidly being depleted. In some areas, the water table is dropping by as much as two feet per year. In 2005, the USGS estimated that total water volume was about 2,925,000,000 acre feet (3,608 km 3). This is a decline of about 9% since significant ground-water irrigation development began. Some geologists fear the aquifer could dry up in as little as 25 to 30 years. Once the Ogallala is drained, it will take over 6,000 years to recharge with rainfall.

This decreasing water supply is not just pressing for cities or large scale farming. Sixteen percent of US citizens live outside of cities and rely on personal wells for water. Texas alone has 3.6 million rural residents. Typically, these people are forced to spend valuable time and money digging wells and softening their water or face having have poor tasting, poor quality water that will drastically shorten the lifespan of their air conditioners and washing machines resulting in hundreds of dollars more in repair and replacement costs. These wells source their water from the ground and as sea levels are rising, they are polluting these fresh water sources with salts and other contaminants. Those provided with water from surface sources are also facing increased threats. As heavy precipitations become more frequent & violent, larger volumes of sediments become suspended in water, reducing its quality. Furthermore, higher air temperatures are leading to higher water temperatures which lead to longer period of summer stratification (when surface and bottom water do not mix). This can cause lower levels of oxygen in the water which among others issues, decreases the purification capabilities of rivers. As such, the stress of fresh water will increase on several fronts.

As surface and well water supplies are hastily being depleted, many governments and municipalities are turning their attention towards desalination. According to the International Desalination Association, in 2009, 14,451 desalination plants operated worldwide, producing 59.9 million cubic meters ($2.12 \times 10^9$ cubic feet) per day, a year-on-year increase of 12.3%. It was 68 million cubic meters in 2010 and expected to hit 120 million cubic meters by 2020; 40 million cubic meters of which is planned for the Middle East alone. Unless an improved technology is implemented, this trend will only increase. Interestingly, over 60% of the cost in desalination is a result of the upstream cost, the treatment and filtration of the seawater in preparation for reverse osmosis. However, this is only a fraction of the problem with existing desalination technology, as the initial capital investment costs of desalination plants typically exceeds well over a billion dollars, with annual maintenance costs of $30-40 million. Desalination is also an inadequate means of providing water to the interior areas, as they require pipelines costing millions of dollars to construct and operate. Additionally, desalination systems are vulnerable to sea level rises and natural disasters such as hurricanes (e.g. the Gulf) and earthquakes (e.g. California). This is an important limitation as there have been the most significant rises in sea levels and tectonic activity in some of the most water stressed areas of the globe.

In the atmosphere, there is a natural abundance of water vapor being stored in the troposphere. Clouds of course are the most visible manifestation of atmospheric water vapor, however, even in clear air conditions there is an enormous quantity of water vapor in the air. About 0.001 percent of the Earth's total water volume is stored in the air, which upon calculation yields 1,385,000,000 $km^3$ of water in a constant evaporation-condensation-precipitation cycle. More specifically, the troposphere contains 37,500 trillion gallons of water—a 10 year global supply. Fortunately, the water in the troposphere is replenished at a rate of 3,125 trillion gallons per day, which leads to the belief that this source of water can be a highly sustainable and renewable source of fresh water. Due to the natural cycle of evaporation, this water is already in a relatively pure state as compared to fresh surface water.

There have been attempts in the past to recover water from ambient air but these systems have had significant limitations. For example, it is well known that cooling air at or below its dew point causes condensation of water vapor from the air, resulting in a decrease in the absolute humidity of the air. Existing air-to-water generation systems which utilize this process are limited in that the quantity of water than can be produced, and are heavily hindered by the enormous energy requirements—as the process incurs heavy energetic costs to reach the dew point. Since the humidity and temperature of ambient air varies from region to region, the quantity of water that can be produced using with this technique is seldom adequate or consistent. Despite the attempts to introduce sophisticated pinch analysis techniques into this process, the thermodynamic path still remains far too energy intensive to be considered as an alternative source of water.

Another technique that has been attempted is the use of solid adsorbents such as disclosed in U.S. Pat. No. 4,365,979. These techniques pass air through a column packed with a solid adsorbent to adsorb water from the air. The water saturated adsorbent is then heated—statically or with dry hot gas—to effectively evaporate the water, and in doing so generating a saturated water vapor stream which is subsequently condensed to its liquid form. Unfortunately, this type of system continues to be subject to variation in the humidity of the ambient air, energy intensive, and difficult to keep in continuous operation. In addition, the energetic pathway relies upon two costly phase changes, evaporation and condensation, causing excessive energy consumption.

Another technique that has been attempted to produce water from ambient air is disclosed in PCT/US2005/030529 ("the Sher process"). As best can be determined, the Sher process entails removing water from the ambient air by exposing a first ambient air stream to a desiccant to increase the water content of the desiccant. This desiccant is then exposed to a second air stream to facilitate the evaporation of the water that had been absorbed by the desiccant mating a water saturated air stream. The saturated air stream is subsequently exposed to a heat exchanger to facilitate condensation. To facilitate the Sher process, the first airstream is cooled by the initial desiccant (which has been cooled below the ambient airflow) to induce a favorable temperature gradient required for adequate mass transfer into the desiccant. The second air stream which is passed over the desiccant, is heated along with the desiccant to facilitate water evaporation from the desiccant in order to generate a saturated airstream. To harvest the water from the saturated air stream in the Sher process, the stream subjected to cooling to induce a phase change through condensation. To facilitate the required heat transfer required for condensation and evaporation, a system of heat exchangers and refrigerants are utilized to support the process. The harvested water in question is then purified to potable standards.

The Sher process for harvesting atmospheric water is not dissimilar in to a desiccant wheel; whereby, the thermodynamic pathways are evidently similar. However, the Sher process utilizes well known prior art desiccant materials (both solid and liquid) capable of adsorbing the water from the ambient. There are a number of inherent deficiencies in the Sher process, including the requirement for two different ambient air streams, throughputs which are substantially limited by two separate air/desiccant contacting methods, substantial heating and cooling requirements, unfavorable mass transport and thermodynamic conditions, and higher temperature operation requirements.

As can be seen, there is a need for a system and a method of producing water from air that is versatile over various ambient air conditions, that is not as energy or capital intensive as prior art systems, and that can be in continuous operation without significant maintenance problems.

BRIEF SUMMARY OF THE INVENTION

The present invention provides a method and a system for producing water from atmospheric air by contacting the air with an aqueous hygroscopic material in a contacting chamber and allowing a portion of the water from the air to be adsorbed into the aqueous hygroscopic stream. The adsorbed water is then subsequently separated from the hygroscopic material to provide a clean water stream and a reconstituted hygroscopic stream.

In a preferred embodiment, water is removed from atmospheric air by absorption using an aqueous hygroscopic salt solution. Preferably, an atmospheric air stream is contacted counter-currently with an aqueous salt solution stream in a contacting chamber comprising at least one bed of packing material. Preferably, particulate matter is removed from the atmospheric air stream prior to entry into the contacting chamber, and the aqueous salt solution stream is cooled to below ambient temperature prior to being introduced into the contacting chamber. In a most preferred embodiment, the contacting chamber comprises rotating packed beds of structured or random packing material. A portion of the water from the atmospheric air stream is absorbed by the aqueous salt solution stream in the contacting chamber creating an enhanced water-salt solution stream. The portion of water absorbed from the air is subsequently removed from the aqueous salt stream in a closed loop process. Preferably, the portion of water is removed using a reverse osmosis cascade, whereby the enhanced water-salt stream is introduced into a reverse osmosis membrane containment vessel under pressure which separates out a clean water stream from a reconstituted aqueous salt solution.

Embodiments of the present invention can be built in a wide range of capacities from a small household unit, to a portable system, to a large industrial scale facility. As a non-limiting example, a small domestic unit could produce around 300 to 1000 gallons per day. While the industrial scale could produce twenty thousand gallons per day and upwards, depending on the desired output.

Embodiments of the present invention can be operated as a standalone HVAC system or to be used to increase efficiency of existing HVAC systems. As a result of the exothermic nature of water's heat of sorption, the inlet air from the ambient is cooled as water vapor is removed from the stream. Although this heat of sorption is minute in the lower humidity ranges, in the upper regions (100% relative humidity), these effects can be significant. As a result of this phenomena, the system could actively act as an air conditioning system or be used upstream of HVAC systems to increase efficiency while alleviating the burden of water vapor removal from the system.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION OF THE INVENTION

The present invention achieves the objective of producing water from atmospheric air through application of Raoult's Law:

$$P = X_{solv} P^0_{solv}.$$

Figure 1:
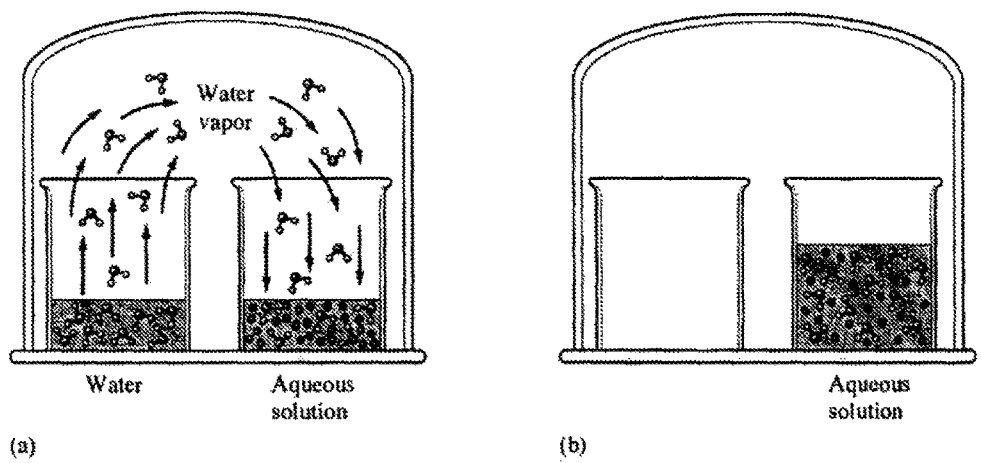
FIG. 1 is a depiction of mass transfer of water to an aqueous solution based upon Raoult's Law and the Antoine Equation, wherein (a) depicts an initial closed system with a beaker of water and a beaker of aqueous solution, and (b) depicts the results of Raoult's Law whereby a portion of the water has been transferred into the aqueous solution.

For purposes of clarifying this concept, FIG. 1 depicts mass transfer of water to an aqueous solution based upon Raoult's Law, wherein FIG. 1(a) depicts an initial closed system with a beaker of water and a beaker of aqueous solution, wherein water molecules evaporate forming water vapor. A portion of the water molecules in the vapor contact the aqueous solution and are absorbed into the solution. Depending upon the conditions, such as pressures, temperatures and relative quantity of the molecules, the water beaker will continue to evaporate and be absorbed into the aqueous solution until the water beaker is virtually empty, as shown in FIG. 1(b).

The present invention provides a method and a system for producing water from air by contacting air with a hygroscopic material and subsequently separating the water from the hygroscopic material to provide water. In a preferred embodiment, water is removed from atmospheric, air by absorption using an aqueous salt solution stream and the removed water is then separated from the aqueous salt solution stream to provide water permeate stream.

Embodiments of the present invention can be operated at a wide range of humidity levels and temperatures for the ambient air. Preferably embodiments of the invention are designed to operate most effectively where ambient conditions include relative humidity ranges above 20% and temperatures between 40 to 110° F. Preferably, the embodiments of the present invention can be operated in humidity ranges where there is 6.0 to 25.0 g/m$^3$ of saturated water vapor present in the atmosphere. In alternative embodiments utilizing an added pressure driving force, the system can be utilized in regions which have as little as 1.0 g/m$^3$ of water vapor in the atmosphere.

In a preferred embodiment of the invention, the system has four distinct subsystems. The first subsystem comprises an air quality control process to remove particulate matter. The second subsystem comprises a water absorption system to continuously adsorb water from the air into a process solution. The third subsystem comprises a process to separate out water from the process solution, preferably by a reverse osmosis cascade, and recirculate the reconstituted process solution to the water absorption system. The fourth subsystem comprises a water purity system to purify water for sanitary and potable purposes. In addition to these four subsystems, the most preferred embodiment includes a process control system that controls each subsystem and can adjust for changes in ambient conditions.

Figure 2:
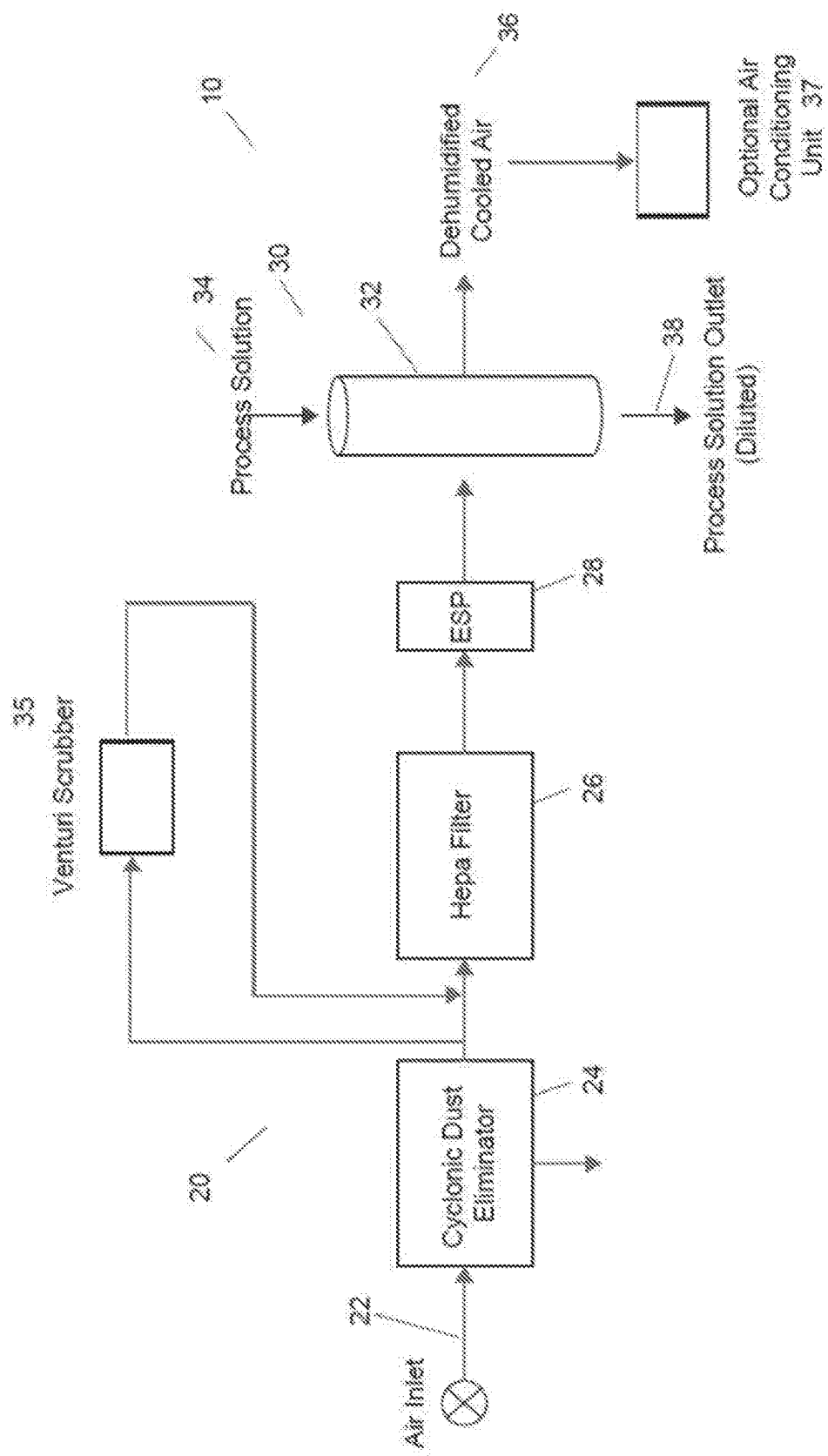
FIG. 2 is a block diagram of the process flow for an embodiment of the air-quality control system.

As shown in FIG. 2, the first subsystem of the system comprises the air quality control process 20 which removes particulate matter and produces a clean atmospheric air stream. Preferably, the air quality control process begins by passing an atmospheric air stream 22 through a cyclonal dust removal system 24 that preferably removes about 98% of dust and particulate matter greater than 5 microns from the air stream.

As part of the air quality control subsystem, the air stream 22 exiting the cyclonal dust removal system 24 is preferably filtered a second time utilizing a fabric filter 26 (ex. HEPA filter). At this stage, preferably around 99.8% of the particulates less than 5 microns can be removed; however, viruses and some bacteria may remain.

In the preferred embodiment of the invention, the air quality control subsystem 20 further includes an electrostatic precipitator 28. The air stream 22 exiting the fabric filter 26 is preferably passed through the electrostatic precipitator 28 to remove the remaining particulates in the air stream— including viruses and bacteria which have passed through the initial air handling stages.

Additionally, in very aversive conditions in which the ambient air is laden with heavy particulate matter, a wet scrubber (not shown) can be added to the system 20. For example a venturi scrubber (not shown), could be added the air quality control system 20 for use in the industrial setting.

Alternatively, additional cyclonic dust removal systems 24 could be added to be operated in series in heavy particulate environments.

Due to the pressure drop across the air quality control system 20, blowers or fans (not shown) may be necessary to advance air stream 22 through the system and should be adequately sized to maintain adequate air pressure for the system. Depending upon the particular design conditions, a single blower system may be sufficient or blowers may be necessary with each element of the air quality control system 22 to provide the adequate pressure needed to operate these individual elements. As will be recognized by those of skill in the art, the sizing of the dust elimination systems and blowers can be tailored to the desired processing size of the entire system, more specifically, to the desired water output parameters. For example if the desired output of water to be generated is 400 gallons/day, then a blower of ~2500 cubic feet per minute may be necessary when ambient conditions are about 70° F. with a relative humidity of about 65%.

The process control system can provide important advantages in the operation of the air quality control system 20. Preferably, the air flow rate (the volumetric flow rate) through such the system can be monitored and controlled by the process control system to ensure the required amount of water is available for the system in the incoming air stream. For example, if the desired water output is 350 gallons per day, the required air flow rates would be range from 2000 to 4000 cubic feet per minute, depending on the water vapor content of the ambient. Further, to minimize energy costs, a process control system preferably determines if one or all of the components of the air handling system are to be used at a particular time based upon the collection efficiency of each of the subsystems and the amount of particulate matter in the ambient air.

The air quality control subsystem 20 of the present invention assists in operating the system as a closed-loop as to the liquid desiccant. Particulate matter which is not removed in the air quality control subsystem 20 can become entrained into the liquid desiccant stream. Over time, the particulate matter can accumulate in the liquid loop, leading to membrane and liquid handling systems fouling—requiring maintenance or repairs. For example, if a high level of dust becomes entrained in the liquid desiccant, the liquid desiccant might require replacement or cleanup to minimize system damage.

Figure 3:
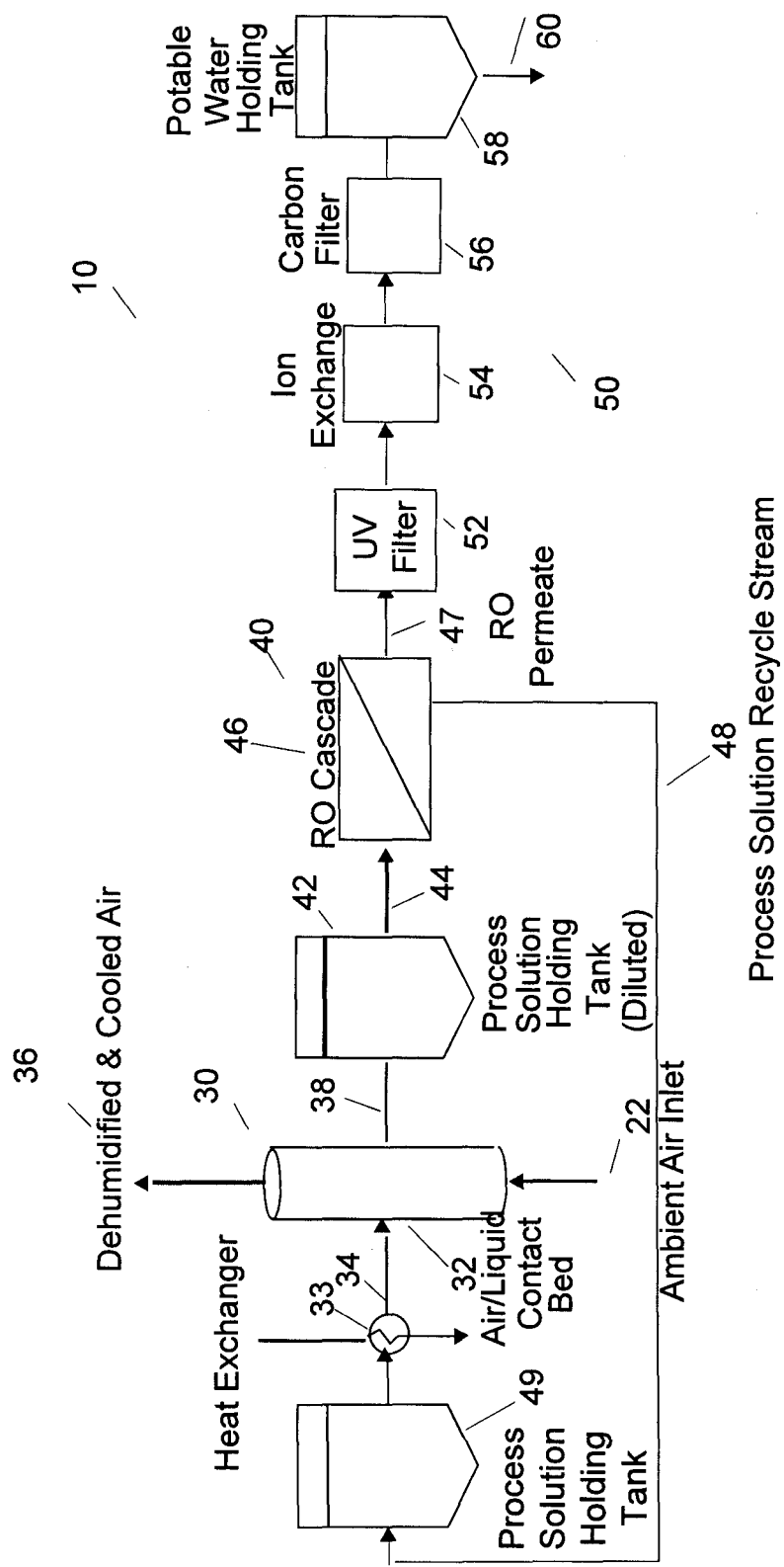
FIG. 3 is a block flow diagram of the process flow for an embodiment of the liquid-handling system.
Figure 4A:
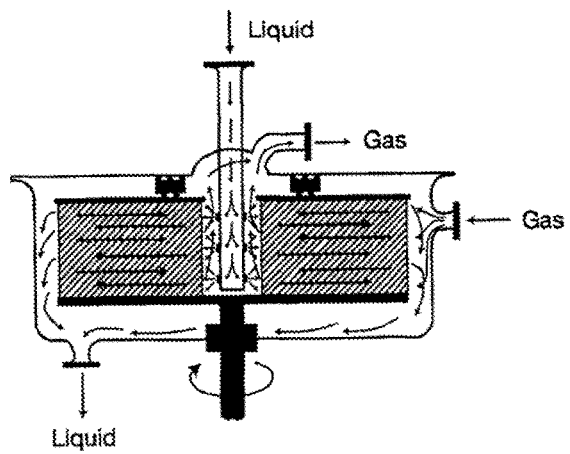
FIG. 4a is a depiction of an embodiment of a rotating packed bed such as may be utilized in an embodiment of the present invention.
Figure 4B:
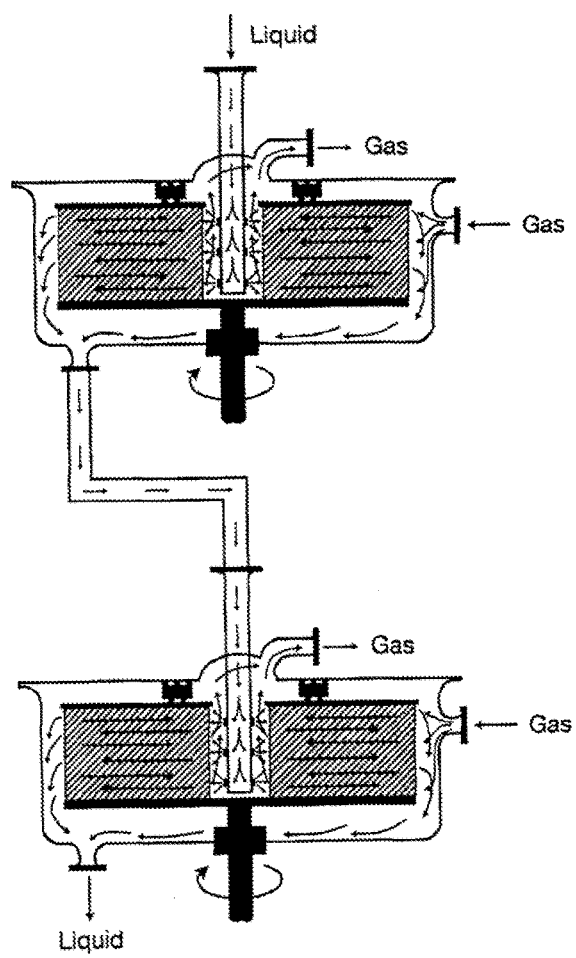
FIG. 4b is a depiction of an embodiment of a series of two rotating packed beds such as may be utilized in an embodiment of the present invention.
Figure 4C:
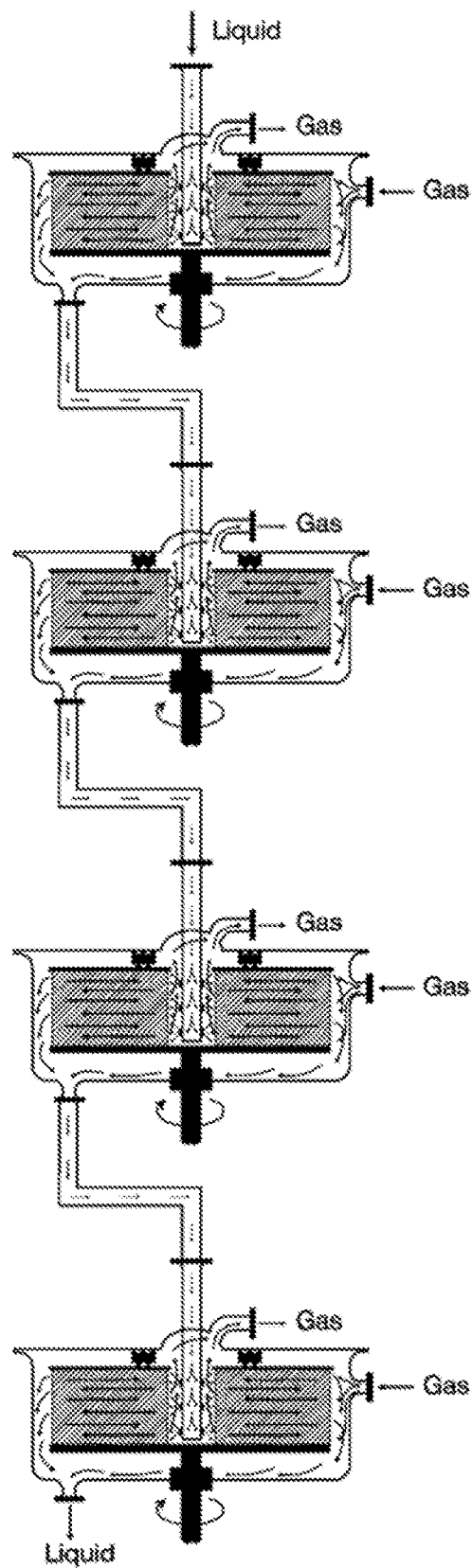
FIG. 4c is a depiction of an embodiment of a series of four rotating packed beds such as may be utilized in an embodiment of the present invention.
Figure 4D:
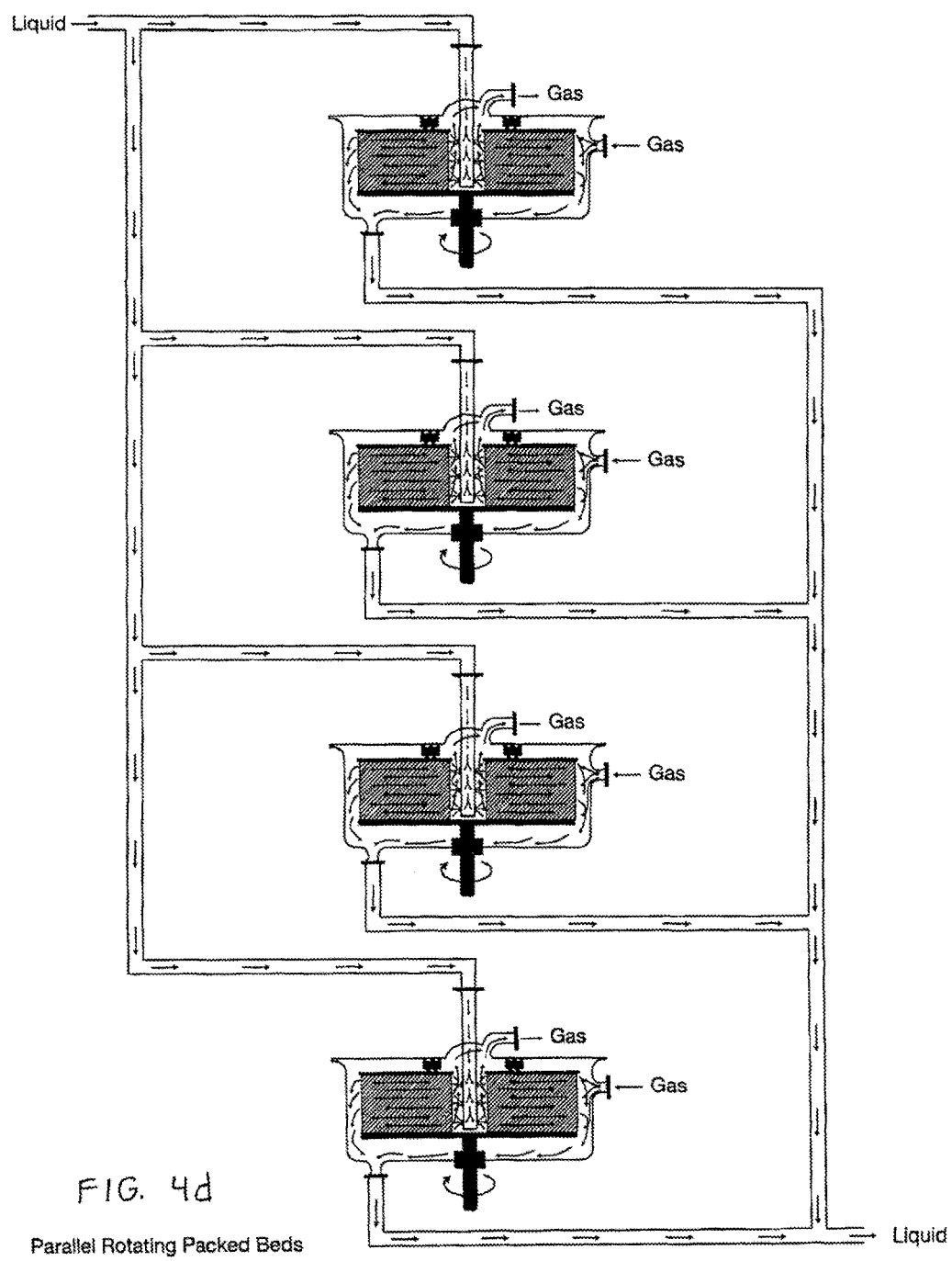
FIG. 4d is a depiction of an embodiment of a parallel cascade of rotating packed beds such as may be utilized in an embodiment of the present invention.

As shown in FIGS. 2 and 3, the second subsystem is the water absorption subsystem 30. The water absorption system 30 utilizes a circulating hygroscopic material, preferably an aqueous salt solution, to absorb water from the air stream 22. The ability of the solution to absorb water from the air stream 22 is a function of the equilibrium conditions of the water vapor pressure in the process salt solution and ambient air, and the surface area available to maximize absorption. Additionally, there lies a tradeoff between maximizing turbulent processing rate and contacting time between the ambient air and process salt solution.

Preferable, the aqueous salt solution stream 34 is a combination of water and calcium chloride, lithium chloride, or both calcium chloride and lithium chloride. In other embodiments zinc chloride, magnesium sulfate, magnesium chloride or other salts can be utilized. The composition of aqueous salt solution stream including the components, concentrations, etc. can be optimized for both mass transport and economic feasibility. The range of salt concentration utilized in the preferred embodiment can be from 20-50% depending on the average temperature and humidity of the area (for example, higher the average humidity of the area, lower the salt concentration needed to achieve optimal results). The salt solution which results in the highest absorption of water vapor is a 40%-50% LiCl salt solution. But based on price analysis and practical considerations, the preferred salt solution concentration consists of 35-40% mixture of the LiCl and $CaCl_2$, preferably with more LiCl than $CaCl_2$. The optimization of the $CaCl_2$ and LiCl can be conducted based on the average relative humidity of the area.

The rate of moisture absorption by these salts mainly depends on the surface of the salt or the solution exposed to the air, the rate at which the air circulates over these salts, and the water vapor pressure in relation to the vapor pressure of the salt solution. The important property which relates to the hygroscopic nature of the salts is called deliquescence. This means that the certain salts are so hygroscopic that they readily dissolve in the water they absorb. In order for deliquescence to proceed, the vapor pressure of the water in the air must be greater than the vapor pressure of the saturated solution.

For a solid salt of $CaCl_2$ (the commercial DOWFLAKE or PELADOW version) at a relative humidity of 40% and temperature of 77 F, the salt can absorb nearly 1-1.2 pounds of water per pound of calcium chloride. (At 95% humidity, the salt can absorb 13-17 pounds of water).

The amount of water absorption possible for a given salt solution can be readily determined. For example, a 40% salt solution of $CaCl_2$ in water is equivalent to 5 pounds of 95% $CaCl_2$ in 1 gallon of water (total weight of 1 gallon of 40% solution=5+8.35=13.35~13 pounds). At a relative humidity of 60% and temperature of 25° C. for the salt solution and the atmospheric air, equilibrium is reached with atmospheric humidity when the $CaCl_2$ solution concentration becomes about 31%. This means that for per pound of $CaCl_2$ in the solution, 0.7 pounds of water can be absorbed. It can then be derived that for one gallon of 40% $CaCl_2$ solution, 3.5 pounds of water is absorbed (0.4 gallons). Therefore, for one gallon of water utilized in the salt solution, approximately 0.4 gallons of water can be recovered from the air. The above is a conservative estimate based on moderate parameters and no optimization for the air handling system. The output mentioned above can be driven up considerably by incorporating our process systems.

The preferred embodiment utilizes a salt solution for water sorption; however, the possibility of using the solid salts equivalent for acquiring water vapor molecules is within the scope of the broader concept of the invention.

The water absorption system 30 preferably comprises a contacting chamber 32 or tower that preferably includes a bed of high surface area packing materials, preferably constructed from plastics or ceramics to provide a wetted-contact surface for absorption. The packing material is preferably designed to be either random packing (saddles, rings, Intalox saddles, Berl saddles, high-performance packing, etc) or structured packing—depending on the comparative economics of mass transfer efficiency to cost ratio. To prevent corrosion in the contacting chamber 32, it can preferably be constructed out of fouling and corrosion resistant materials (e.g. fiberglass, plastics and ceramics) to ensure operational longevity of the system.

Preferably, the contacting chamber 32 receives a continuous flow of the aqueous salt solution stream 34 from a reservoir 49 in fluid communication with the contacting chamber 32. The dimension of such a reservoir can be determined by the sizing of the contacting chamber; however, preferably the reservoir 49 will provide a volumetric hold-up of about $1/10^{th}$ to $1/5^{th}$ of the total process salt solution in the entire system. The purpose of the reservoir 49 is to maintain adequate process salt solution volume in the system, so as to prevent pumps (not shown) from operating under 'dry' conditions and prevent system flooding upon dilution. The reservoir 49 can be designed to maintain fluid homogeneity. Additionally, fluid properties such as pH, temperature and salinity can be measured in reservoir 49 by the process control system; however, the sensors can be placed at different locations depending on the process control configurations and optimization.

In some preferred embodiments, the contacting chamber 32 can be operated at elevated pressures to add a third driving force (pressure) into the system. As such, the additional pressure can accelerate the processing time of the apparatus, allowing a quicker harvest of water As shown in FIGS. 4a, 4b, 4c and 4d, preferably, the contacting surface area can be achieved by the use of rotating packed beds. While some embodiments may employ a single rotating packed bed (see FIG. 4a), preferred embodiments may utilize more than one, in which case the beds may be operated in series (see FIGS. 4b and 4c) or parallel (see FIG. 4d). Rotating packed beds are preferred contacting chambers because mass transfer rates are increased by rapid circulation of the process solution and the creation of turbulent contacting area available to contact with the air stream. Preferably, the air stream contacts the liquid stream counter currently, but co-current, cross-flow, or contra-current contact can be utilized as well.

The optimal sizing for the rotating packed beds can be determined through both empirical-correlations and bench-scale optimization. In a preferred embodiment, the rotating packed beds rotate at around 300 to 3000 rpm depending on the optimal operating conditions for the operating environment to maximize the absorption using a continuously circulating hygroscopic material, preferably an aqueous salt solution.

Figure 5A:
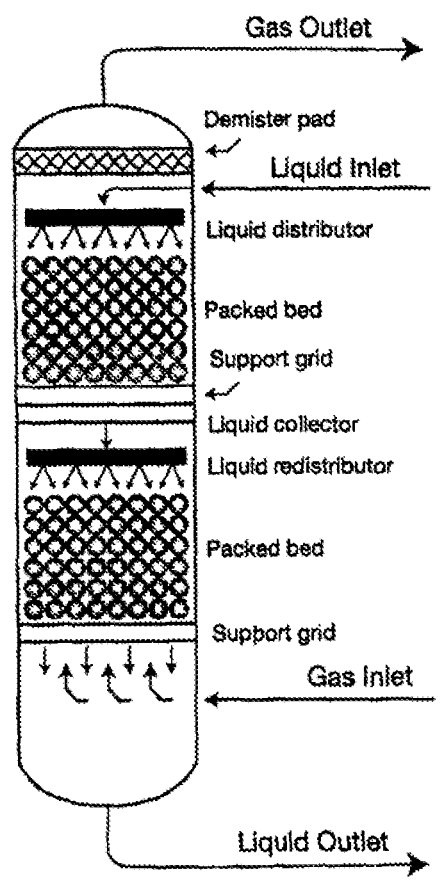
FIG. 5a is a depiction of an embodiment of a single packed bed column such as may be utilized in an embodiment of the present invention.
Figure 5B:
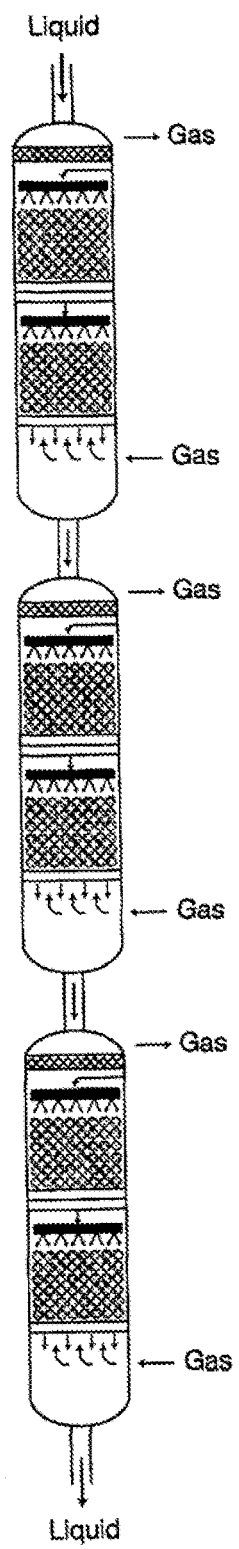
FIG. 5b is a depiction of an embodiment of series of packed bed columns such as may be utilized in an embodiment of the present invention.
Figure 5C:
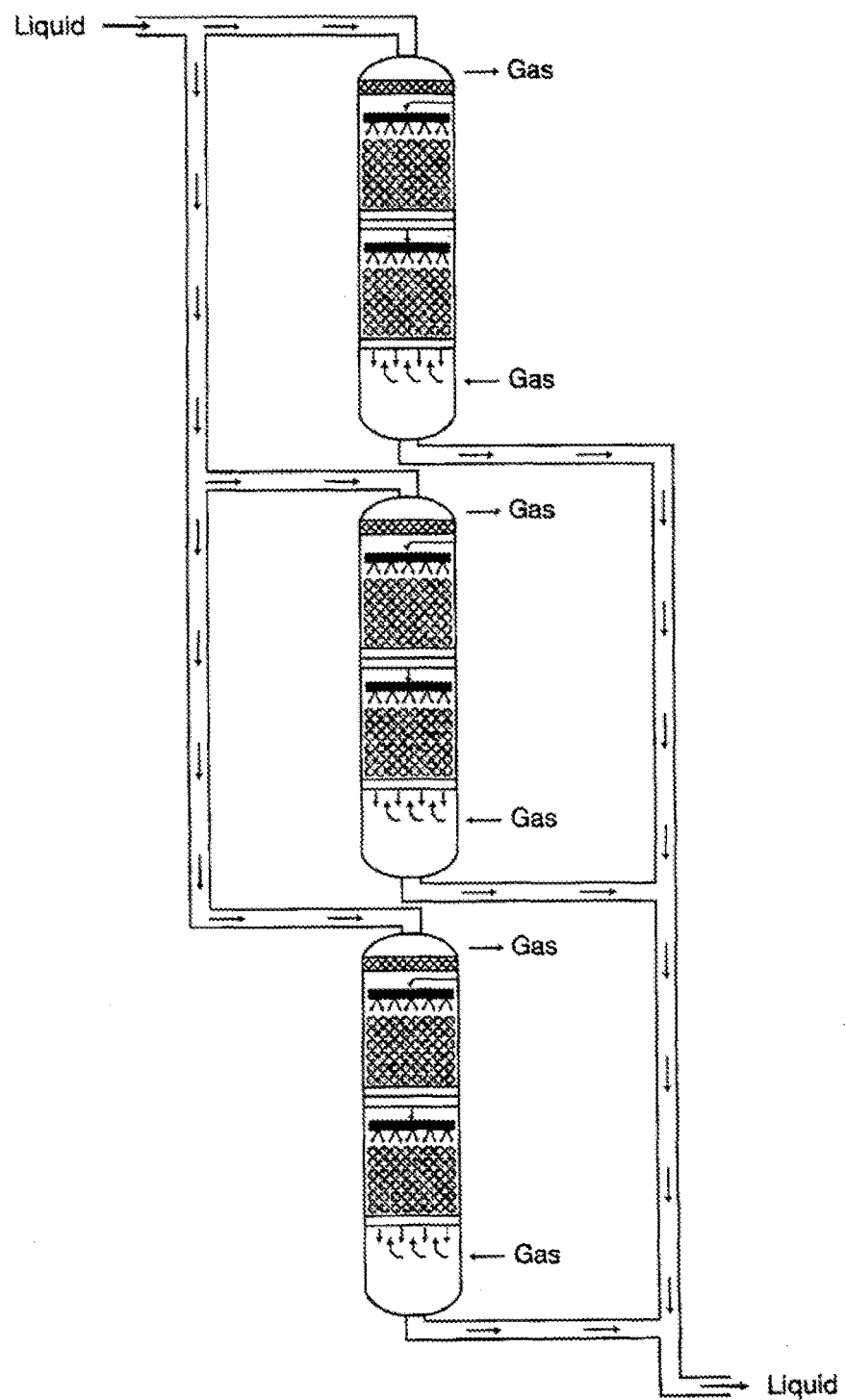
FIG. 5c is a depiction of an embodiment of a cascade of parallel packed bed columns such as may be utilized in an embodiment of the present invention.
Figure 6:
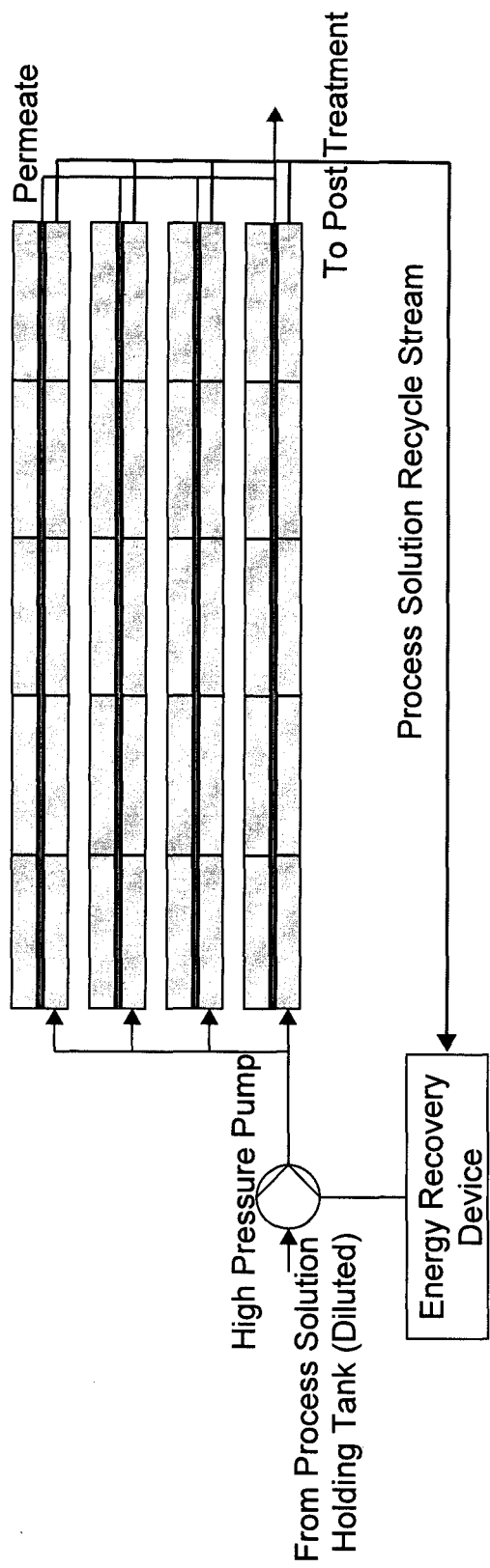
FIG. 6 is a depiction of process of reverse osmosis such as may be utilized in an embodiment of the present invention.

Alternative embodiments of the present invention include, depending on the desired processing rates, use of a standard non-rotating packed column. More than one fixed bed column operating in either series or parallel can also be used in substitution for rotating packed beds (see FIG. 5a-c). The internals of these fixed bed columns can contain either a structured or random packing material to provide adequate surface area for contacting the aqueous stilt solution with the water vapor from the air stream. In this embodiment, the height of the packed towers can be determined through the HETP (Height of Equivalent Theoretical Plate) Method, and the diameter will be a function of the height of the column; while the dimensions of the packing material will be a function of the column-to-packing diameter ratio. The other options within the broad scope of the invention for contacting the aqueous salt solution stream 34 and the air stream 22 include using venturi scrubbers, spray towers, bubble columns, tray columns, and falling film contacting.

Preferably, the aqueous salt solution steam 34 is cooled in heat-exchanger 33 to below ambient temperature prior to entry into the contact chamber 32. Cooling steam 34 aids mass transport of water into the aqueous salt solution. By doing this, a temperature gradient is generated to add a second driving force for the water to be absorbed. Preferably, the aqueous salt solution stream 34 is cooled in the range of 5 to 40° F. degrees below the ambient air temperature. As such, the cooling capacity of the heat-exchanger must be sufficient enough to reach, and maintain, the desired temperature despite the generated heat through the heat of sorption and frictional forces. Conventional heat exchangers or refrigeration systems can be utilized for exchanger 33. Additionally, sustainable energy sources such as geothermal heat sinks or utilization of local bodies of water can be utilized to provide a medium of temperature exchange.

A combination of high ionic species concentrations in the produced water presents a potential scaling environment in the device. Although, measures such as low temperature (~20 C) and low pH, coupled with controlled interaction with the atmosphere can ensure that the scaling issue is not a harsh one, preferably a non-toxic and device-friendly way of dealing with the scaling issue is utilized. One such technique is the use of sulfonates. The metallic salts of alkaryl sulfonic acids, commonly referred to as "sulfonates," belong to the class of lubricating oil additives known as detergents. Unlike household detergents, these detergents are specifically designed to be soluble in oil, and are insoluble in water. Various sulfonate copolymers are known which combine the scaling treatment properties of sulfonate and retention and dispersion properties of other polymers such as carboxylic acids polymer or a phosphorus monomer (or phosphonate based inhibitors). As an example, ACU-MER™ 2100 Scale Inhibitor and Dispersant Carboxylate/sulfonate copolymer functions as a scale inhibitor and dispersant for water systems.

As can now be understood, the present system uses one air stream which is contacted with a liquid desiccant, preferably through packed beds operating in parallel or series. This is a significant improvement over prior art systems such as the Sher process which requires two separate air streams and appears to utilize a spray tower for liquid desiccant contacting or a solid-gas contacting scheme to achieve mass transport. When comparing these two methods of contacting air to desiccant, the present system has inherent advantages including increased contacting time, favorable turbulent mixing to facilitate mass transport (over their laminar mixing), and increased throughput processing. Particularly for embodiments utilizing rotating packed beds, a tenfold increase in air processing speed and facilitated mass transport can be achieved.

As shown in FIG. 3, the third subsystem of the preferred embodiment is the water recovery subsystem 40. Once water has been absorbed from the clean atmospheric air stream 22 into the hygroscopic solution, the absorbed water must be removed to yield a recovered water stream 47 and to reconstitute the aqueous salt solution which is needed to maintain the closed loop. In the preferred embodiment of the present invention, water recover is achieved by means of a reverse osmosis system 46. More than one reverse osmosis system can be utilized for water recovery, operating either in parallel or series.

Preferably, a diluted process solution containment vessel 42 is provided downstream to the water absorption system 30. This vessel is a secondary measure to hold the diluted salt solution for liquid hold-up for the water recovery subsystem; being systematically placed to prevent system flooding given the volumetric increase upon water absorption into the salt solution. Preferably, the fluid properties such as pH, temperature and salinity are measured in containment vessel 42 by the process control system; so as to ensure the operating constrains of the water recovery subsystem are met. This layer of control prevents subjecting the membrane aversive conditions and subsequent damage. The containment vessel is preferably constructed out of fouling and corrosion resistant materials (e.g. fiberglass, plastics and ceramics) to ensure operational longevity of the system.

Preferably; the reverse osmosis process begins with supplying an enhanced water aqueous salt solution stream 44 from a containment vessel 42 which is immediately downstream from the contacting chamber 32. The flow rate and pressures of this stream 44 will be a function of the osmotic pressure required for the membrane to generate a potable permeate water stream 60. Pumps (not shown) can provide the desired fluid flow rates and can preferably be operated in series to generate adequate head-pressure required by the reverse osmosis membrane.

Preferably, due to the potential pressure constrains, a cascading membrane or recycle scheme can be employed to alleviate the burden of operating membranes at high pressure differentials. With the cascade system, the membranes can be operating under far milder conditions. As such, the membranes could feasibly be operated under high-pressure osmotic operating conditions while reducing the risk of membrane compaction. Depending on the equilibrium conditions of the process solution, the membranes should preferably be able to be operated in the range of 30 to 400 bars. Additionally, with the implementation of energy recovery devices, such as pressure exchangers and energy recovery turbines, high pressure associated energy costs can be mitigated.

Alternatively, other methods for reducing the operating pressures of the reverse osmosis membranes can be utilized. For example, an ion concentration polarization system; which can provide a less concentrated process solution stream for the reverse osmosis scheme and a pure water stream can be utilized. Also, a forward osmosis scheme can be employed to reconstitute the process solution and provide a potable water stream.

The preferred reverse osmosis membrane can include asymmetric membranes, thin film composite membranes, ceramic membranes, forward osmosis membranes or membrane distillation schemes. A preferred embodiment of the invention preferably utilizes asymmetric thin film composite membranes. These preferred membranes are highly resistant to fouling, very permeable to water, low pressure, low cost, and easily cleaned using the preferred cleaning cycle. For a preferred embodiment of a unit for domestic water production, DOW XLE membranes, such as the 2540, with capacity for daily flow rates of between 865 and 1025 gallons/day can be utilized.

The enhanced water aqueous salt solution characteristics—temperature and pH—are preferably controlled to within the operating guidelines of the specific membrane utilized to ensure the operational longevity of the membranes, thereby preventing unnecessary maintenance. Typically, the membranes can be operated at a temperature below about 110° F. and a pH of about 9.5 to prevent damage. However, to prevent scaling and fouling, the system will already avoid these issues as the process solution will be maintained and operated in a significantly lower pH range.

While known membrane systems are often forced to cope with high temperatures and pressures due to the traditional methods of desalinization, resulting in increased compaction and shorter membrane life, the preferred embodiments of the present invention operate at moderate pressures, preferably less than 50 bar, and the temperature of the salt solution is preferably kept cool, most preferably around 60° F. As shown by the standard equation for membrane compaction (Pressure (bar)×Temp (degrees)=below 1200 to prevent compaction), the preferred operating temperatures and pressures enhance membranes life, preferably to about 10 years. Additionally, the preferred embodiment includes an integrated acidic non-solute water flush cycle which also enhances membrane life and design flow rates, as the acidic solution will guarantee a return to original flux rates upon each cycle.

The preferred embodiment utilizes a make-up water source which is nearly pure. When combined with the preferred salts, for example calcium chloride and/or lithium chloride, the preferred aqueous solution preferably has very little impurities (bacteria, particulates, halides, organics etc). Under these circumstances, mechanisms or processes typically required to protect the membrane are not necessary to produce water that is over 99% pure.

Known reverse osmosis systems usually have limitations placed on their capabilities by the quality of the feed water, which has traditionally been seawater, ground water, or waste water. Using these traditional sources, contaminants like heavy metals and minerals interact with the water's polar structure. Once these contaminants are solvated by water, they become very difficult to eliminate. Additionally, the high number and variety of dissolved solids, bacteria, and organic material found in these sources most often necessitates the need for multiple pre-filters, carbon filters, liquid-liquid separations, chlorine pre-treatment, UV treatment, microfiltration, and/or nano-filtration. Not only do these processes require additional initial capital and ongoing energy costs, many of them are not self-sustaining and have components that must be cleaned and/or replaced to prevent system failure. Further, while known reverse osmosis systems use chlorine treatments to kill microorganisms and by doing so degrade the membranes over time, in preferred embodiments, the membranes utilized are exposed only to water, calcium chloride and lithium chloride, which are non-reactive ionic species and easily kept at high Zeta Potentials with process control system to ensure crystallization does not occur.

Preferably, the reverse osmosis subsystem is a continuous process. The enhanced water salt solution stream 44 is continuously pushed through the membrane containment vessel 46. As the stream 44 is pushed through the vessel 46, a water permeate stream 47 (+99% pure water) is separated for use and/or storage, while a concentrate salt solution 48 (a hygroscopic solution) is preferably diluted with a portion of the permeate water and then returned to the containment vessel 49 for forwarding to the contact tower to begin the absorption cycle once more. Also, since the system preferably feeds itself water, it is able to maintain constant flow and pressure, the hygroscopic solution reaches its adsorbent potential at the highest rate possible and the membranes subsequently draw out as much water as possible, all while requiring less energy than prior art systems.

Preferably, to ensure potability of the water, several membranes operating in series and/or parallel can be used to generate a final permeate stream 47, which is preferably held in compliance with OSHA consumable water standards.

Preferably, the reverse osmosis system includes a permeate back flush valve (not shown) for allowing clean water to be recirculated and used to reconstitute the aqueous salt solution stream. Preferably, the valve allows clean water to be added to a salt solution concentrate reconstitution vessel which regulates and recirculates reconstituted aqueous salt solution to the water absorption system.

Depending on the equilibrium concentration of the process salt solution with the ambient air, in some circumstances other desalination techniques can be utilized alone or in tandem with the reverse osmosis cascade. For example, a scheme of ion concentration polarization operating alone or in conjuncture with the reverse osmosis system may be utilized. Ion concentration polarization can lower the salinity of a salt solution to alleviate the burden of using high pressures on reverse osmosis membranes. Alternatively, ion concentration polarization systems in series or parallel may substitute for reverse osmosis. Additionally, a forward osmosis system can be utilized in conjuncture with the reverse osmosis cascade can be utilized. The advantages of forward osmosis include low or no hydraulic pressures, high rejection of a wide range of contaminants, and lower membrane fouling propensity than pressure driven membrane processes. As best is currently understood, there are no current applications of forward osmosis systems being utilized as the only method of purifying water on large scale. It is generally used as pre-treatment step in the desalination plants. Additionally, reverse electro dialysis can alternatively be utilized to lower the salinity of our solution to alleviate the burden of using high pressures on reverse osmosis membranes. As a further alternative, a membrane distillation scheme might be utilized as a water separation technique. Lastly, directional solvents, which are fatty acids such as decanoic or octanoic acid, can be utilized. Directional solvents have hydrophilic and hydrophobic properties, which prevent water-soluble salts as well as the dissolution of the solvent in water. When heated, the fatty acids absorb pure water and when cooled release that water. The advantages of this technology include the ability to work at low temperatures, filter highly concentrated salt solutions, and solution reuse that lowers costs. Several of these alternative systems may be operated in parallel or series.

As shown in FIG. 3, the fourth subsystem of the preferred embodiment is the water purification and sanitation subsystem 50. Preferably, the water permeate stream 47 exiting the membrane containment vessel 46 is collected in a potable water tank 58 for storage or use. The salinity of the solution can be measured by the electrical conductivity of the solution and/or optically to ensure potability. Preferably, preceding the storage tank 58, the permeate stream 47 will be subjected to an ion-exchange filtration system 54, a carbon or charcoal filtration 56, UV-filtration system 52, and/or electrolyte balancing (not shown) to ensure palatability and potability.

To further facilitate the optimal conditions necessitated for high efficiency operation, preferred embodiments of the system include a layer of process controls to maximize efficiency corollary to certain ambient conditions (temperature, pressure, and relative humidity). The process control system can preferably adjust the operating parameters of the system based upon charging ambient conditions. Additionally, the process control system can preferably determine the optimal path for contacting our air-liquid solution, for example if it is necessary to utilize only the packed beds or rotating packed beds, or if it is necessary to use these systems in parallel or in series. Further, the process control can preferably optimize other system parameters including the temperature for the liquid desiccant, air flow rate, liquid desiccant flow rate & pressure, RPB speed, system pH, and system salinity.

Because the present system is a heavily gas-limited system, preferred systems are easily scalable. Preferred embodiments include a variety of sizes from small domestic units with limited capacity, all the way to large scale industrial units. Because of the scalability of the process, minimal system modifications are required between the domestic units and the industrial units. The main component which requires notable sizing is the air handling system.

Additionally, as a result the embodiment's ease of scalability, the technology can be readily tailored to be used as a portable unit. As such, preferred embodiments could be utilized in highly mobile situations (such as disaster relief, military bases, concrete trucks, etc.) In regards to a portable system, many space saving techniques can be implemented altering the configuration of the entire apparatus. With regards to cement trucks, embodiments of the invention could logistically permit on-she cement mixing as a result of providing potable water for the cement mix. Therefore, new concrete trucks could be specially tailored to utilize these embodiments and in significantly minimizing their logistical shipping costs. This would permit the situation where concrete providers could deliver the cement-mix and mix on site; thereby, reducing the number of trips to-and-from site, extend range of operation and improve overall logistics.

Due to the low energy requirements imposed on the system, embodiments of the present invention can be supplied with energy from renewable sources—such as solar panels or wind turbines. Due to the low cooling requirements, for some embodiments the use of a geothermal heat sink or a heat exchanger coupled to body of water can be utilized to cool to aqueous salt solution to the desired temperature—further minimizing the energy expenditures. Additionally, the energy balances are significantly smaller than what is required for prior art processes such as the Sher process which requires cooling and heating both the desiccant and air streams; which in fact causes unfavorable mass transport and thermodynamic situations.

In an alternative embodiment, a preferred embodiment of the water harvester invention can be coupled to air conditioning units to decrease air conditioning costs. The exothermic nature of absorption, the removal of the water vapor from the air stream subsequently cools the temperature of the air. The cooling and dehumidification of the exiting air stream 36 allows for the system to act as an air conditioner by itself or to greatly increase efficiency of an existing air conditioning system.

Simulated Example

An analytical model was derived which represents the heat and mass transfer analysis of a packed bed for a liquid desiccant system's (specifically, $CaCl_2$ salt solution) absorption of water vapor from the air. The driving potential for mass transfer is the lower vapor pressure of desiccant than that of the air at a given temperature. In a packed bed, the salt water solution and air interact at a surface known as the interfacial surface. During the continuous process of absorption of moisture from the air, conditions such as the composition and the temperature of both the air and water stream vary. Although the system is open, once the air stream comes in contact with the salt water stream, a closed system can be assumed around the two streams. Hence, for calculation purposes, an adiabatic desiccant-air system are considered to exist meaning that the heat lost through the column (tower) is assumed to be negligible. Also, the interfacial temperature is assumed to be similar to that of the salt solution as the salt solution is driving the heat transfer in the process and that the conditions of the interfacial surface are similar everywhere. The broad conclusions which were arrived at from this model indicated that to absorb optimal amounts of water vapor for a smaller packing depth (column height), a concentrated salt solution (about 40%) at a cooler temperature (20-25° C.) is preferred. At these conditions, 70%-90% of the humidity present in the air can be absorbed and amounts of water absorption described in paragraph 37 can be achieved.

The foregoing disclosure and description are illustrative and explanatory thereof, and various changes in the details of the illustrated apparatus and construction and method of operation may be made without departing from the spirit and scope of the invention.

We claim:

1. A process for recovering water from air comprising:
providing an atmospheric air stream comprising water vapor;
providing an aqueous hygroscopic stream;
providing a contacting chamber comprising one or more rotating beds of packing material for mixing liquid and gas streams;
removing particulate from the air stream to provide a clean air stream;
introducing the clean air stream and the aqueous hygroscopic stream into the contacting chamber whereby the clean air stream and the aqueous hygroscopic stream are mixed together and a portion of the water vapor from the clean air stream is removed into the aqueous hygroscopic stream to form a dehumidified air stream and an enhanced water stream, the enhanced water stream comprising water and hygroscopic material;
removing the enhanced water stream from the contacting chamber;
separating a portion of the water from the enhanced water stream thereby creating a clean water stream.

2. The process of claim 1, wherein the removing particulate step comprises:
providing a dust cyclone, a fabric filter, and an electrostatic precipitator;
introducing the atmospheric air stream into the dust cyclone to remove dust;
passing the atmospheric air stream through the fabric filter; and
passing the atmospheric air stream through the electrostatic precipitator.

3. The process of claim 1, wherein the providing a contacting chamber step comprises providing more than one rotating bed of packing material operating in series.

4. The process of claim 1, wherein the separating step comprises separating out water using a reverse osmosis process.

5. The process of claim 1, further comprising the steps of:
providing a UV filtration system;
passing the clean water stream through the UV filtration system;
providing a carbon filtration system;
passing the clean water stream through the carbon filtration system;
providing a ion exchange system; and
passing the clean water stream through the ion exchange system.

6. The process of claim 1, further comprising the steps of:
providing a process control system; and
controlling the process with the process control system by adjusting the operating parameters based upon ambient conditions.

7. The process of claim 1, further comprising the steps of:
providing an air conditioning unit for cooling the atmospheric air stream; and
introducing the dehumidified air stream into the intake of the air conditioning unit.

8. The process of claim 1, wherein the separating step comprises separating out water using an osmosis process.

9. A process for recovering water from air comprising:
providing an atmospheric air stream comprising gaseous water;
removing particulate from the air stream to provide a clean air stream;
providing an aqueous salt solution stream;
providing a contacting chamber comprising one or more rotating beds of packing material for mixing liquid and gas streams;
introducing the clean air stream and the aqueous salt solution stream into the contacting chamber whereby the clean air stream and the aqueous salt solution stream are mixed together and a portion of the gaseous water from the clean air stream is removed into the aqueous salt solution stream to form a dehumidified air stream and an enhanced water aqueous salt solution stream;
removing the enhanced water salt solution stream from the contacting chamber;
providing a membrane containment vessel comprising a reverse osmosis membrane;
introducing the enhanced water salt solution stream into the membrane containment vessel whereby a portion of the water from the stream is separated using reverse osmosis to create a water permeate stream and a secondary salt solution stream.

10. The process of claim 9, wherein the removing particulate step comprises:
providing a dust cyclone, a fabric filter, and an electrostatic precipitator;
introducing the atmospheric air stream into the dust cyclone to remove dust;
passing the atmospheric air stream through the fabric filter; and
passing the atmospheric air stream through the electrostatic precipitator.

11. The process of claim 10 further comprising a venturi scrubber.

12. The process of claim 9, wherein the aqueous salt solution stream comprises water and a salt selected from the group of calcium chloride, lithium chloride, zinc chloride, magnesium sulfate, and magnesium chloride.

13. The process of claim 9, wherein the aqueous salt solution stream comprises water, calcium chloride, and lithium chloride.

14. The process of claim 9, wherein the aqueous salt solution stream comprises water and lithium chloride.

15. The process of claim 9, wherein the aqueous salt solution stream comprises water and about 40% to about 50% by weight lithium chloride.

16. The process of claim 9, wherein the aqueous salt solution stream comprises water and about 20% to about 50% by weight salt.

17. The process of claim 9, wherein the providing a contacting chamber step comprises providing more than one rotating beds of packing material.

18. The process of claim 17 wherein the more than one rotating beds of packing material provided are operating in series.

19. The process of claim 17 wherein the more than one rotating beds of packing material provided are operating in parallel.

20. The process of claim 9, wherein the one or more rotating beds are rotated at between 300 to 3000 rpm.

21. The process of claim 9, further comprising the step of cooling the aqueous salt stream prior to introducing the stream into the contacting chamber.

22. The process of claim 9, wherein the providing a membrane containment vessel comprises providing a system of reverse osmosis membranes operating in parallel.

23. The process of claim 9, further comprising the steps of:
providing a UV filtration system; and
passing the water permeate stream through the UV filtration system.

24. The process of claim 9, further comprising the steps of:
providing an ion exchange system; and
passing the water permeate stream through the ion exchange system.

25. The process of claim 9, further comprising the steps of:
   providing a carbon filtration system; and
   passing the water permeate stream through the carbon filtration system.

26. The process of claim 9, further comprising the steps of:
   providing a UV filtration system;
   passing the water permeate stream through the UV filtration system;
   providing a carbon filtration system; and
   passing the water permeate stream through the carbon filtration system.

27. The process of claim 9, further comprising the steps of:
   providing a process control system; and
   controlling the process with the process control system by adjusting the operating parameters based upon ambient conditions.

28. The process of claim 9, wherein the water permeate stream separated out from the enhanced water salt solution stream comprises between about 300 gallons to about 1000 gallons of water per day.

29. The process of claim 9, wherein the water permeate stream separated out from the enhanced water salt solution stream comprises more than about 20,000 gallons of water per day.

30. The process of claim 9, further comprising the steps of:
   providing an air conditioning unit for cooling air;
   introducing the dehumidified air stream into the intake of the air conditioning unit to increase the efficiency of the air conditioning unit.

31. The process of claim 9, wherein the atmospheric air stream provided comprises between about 6.0 and about 25 grams water vapor per cubic meter of air stream.

32. The process of claim 9, wherein the atmospheric air stream provided comprises air at between about 40 and about 110° F.

33. The process of claim 9, wherein the atmospheric air stream provided comprises air having a relative humidity greater than about 20%.

* * * * *